United States Patent
Schaper et al.

[11] Patent Number: 5,871,683
[45] Date of Patent: Feb. 16, 1999

[54] METHOD OF MOLDING SKATE COMPONENTS

[75] Inventors: Richard Schaper, Maple Grove; Michael Peter Tierney, St. Paul, both of Minn.

[73] Assignee: First Team Sports, Inc., Anoka, Minn.

[21] Appl. No.: 851,806

[22] Filed: May 7, 1997

Related U.S. Application Data

[63] Continuation of Ser. No. 505,032, Jul. 21, 1995, abandoned, which is a continuation of Ser. No. 183,070, Jan. 18, 1994, abandoned.

[51] Int. Cl.[6] .................................. B28B 3/06; B29B 7/00
[52] U.S. Cl. ...................................... 264/297.2; 264/328.7
[58] Field of Search .......................... 264/297.2, 297.3, 264/328.7, 328.8; 425/183, 328.1, 190, 542, 577; 249/105

[56] References Cited

U.S. PATENT DOCUMENTS

| | | | |
|---|---|---|---|
| 327,360 | 6/1885 | Graham | D2/276 |
| 327,565 | 7/1885 | Graham | D2/275 |
| 4,268,981 | 5/1981 | Olivieri | 36/115 |
| 4,408,403 | 10/1983 | Martin | 36/115 |
| 4,509,276 | 4/1985 | Bourque | 36/115 |
| 4,771,555 | 9/1988 | Ohashi | 36/3 |
| 5,030,309 | 7/1991 | Brignet et al. | 156/245 |
| 5,048,848 | 9/1991 | Olson et al. | 280/11.22 |
| 5,092,614 | 3/1992 | Malewicz | 280/11.22 |
| 5,171,033 | 12/1992 | Olson et al. | 280/11.22 |
| 5,262,116 | 11/1993 | Von Holdt, Sr. | 264/297.2 |

OTHER PUBLICATIONS

Rollerblade Handbook, 1991.
Rollerblade Cat. Supp., Fall 1991.
Rollerblade Cat. Supp., Spring 1991.
Rollerblade, Fall Handbook 1990.
Rollerblade Cat., 1988–1989.
Rollerblade Cat. Supp., Spring 1992.
Photograph attached (Exhibit 1) of an Ultra–Wheels® Zephyr Model Skate. The Zephyr skate was present in a show in Chicago, Illinois in Aug. 1992.

*Primary Examiner*—Christopher A. Fiorilla
*Attorney, Agent, or Firm*—Kinney & Lange, P.A.

[57] ABSTRACT

A method of molding different versions of a skate component, the method including providing a single mold, the mold having a mold cavity capable of molding the skate component; attaching a first mold insert within the mold cavity to set a skate feature; injecting molding resin into the mold cavity, the mold cavity including the first mold insert, to form a first version of the skate component; replacing the first mold insert within the mold cavity with a second mold insert to change the skate feature; and injecting molding resin into the mold cavity, the mold cavity including the second mold insert, to form a second version of the skate component.

23 Claims, 13 Drawing Sheets

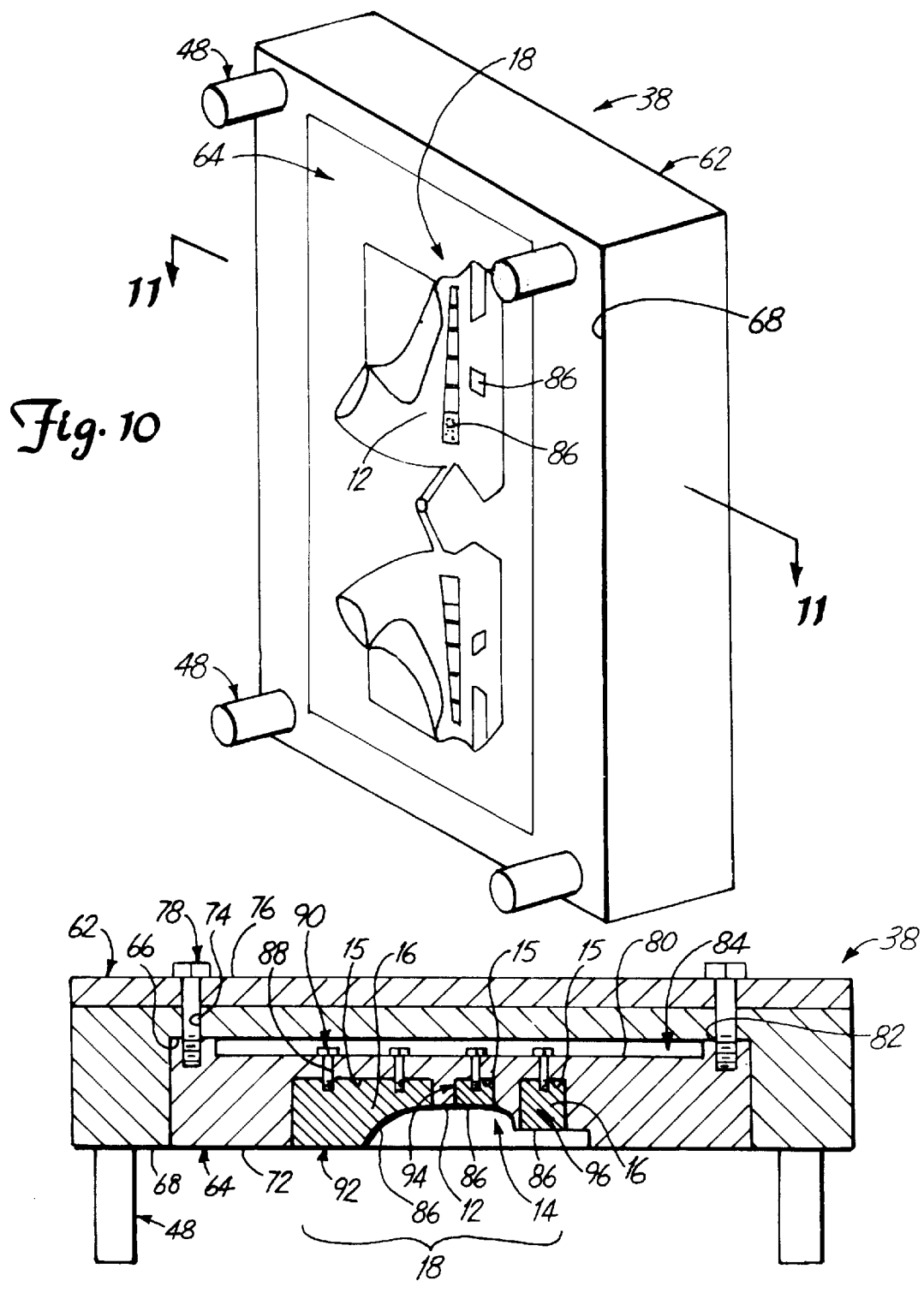

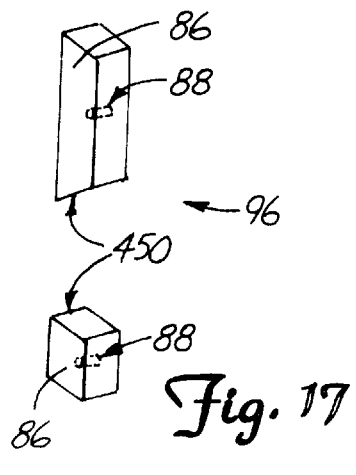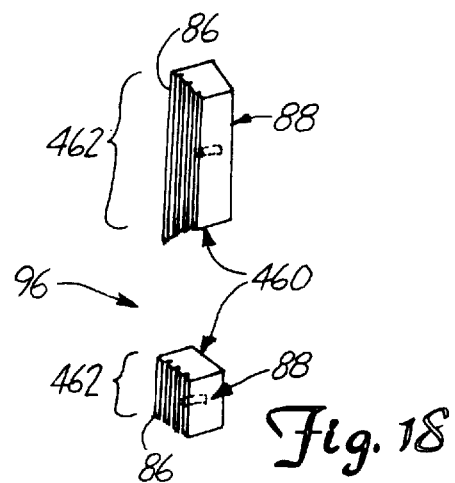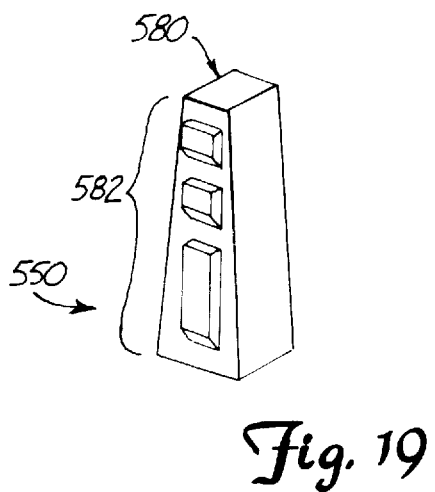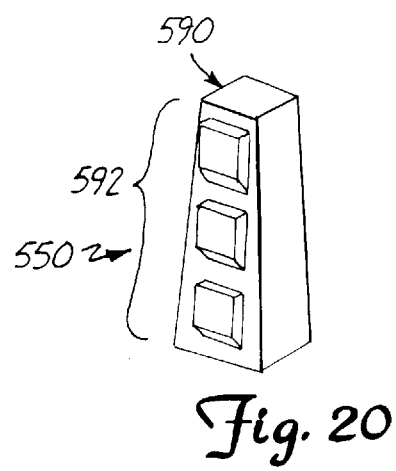

METHOD OF MOLDING SKATE COMPONENTS

This is a continuation of application Ser. No. 08/505,032, filed Jul. 21, 1995 now abandoned, which is a continuation of application Ser. No. 08/183,070, filed Jan. 18, 1994 now abandoned.

BACKGROUND OF THE INVENTION

The present invention generally relates to skates. More specifically, the present invention relates to in-line roller skates and to methods of molding skates and skate components.

Purchasers of consumer goods such as in-line roller skates typically prefer or require any of a wide variety of features. For instance, some purchasers of in-line roller skates prefer skates that are secured to the foot with laces, while other purchasers prefer skates that are secured to the foot with buckles. Some purchasers seek a basic skate without added features, and other purchasers prefer in-line roller skates with many added features such as accent apertures and fancy buckles.

Consumer tastes tend to change over time and sometimes may change quickly. Rapid manufacturer response to changes in consumer taste is often necessary to retain existing customers and to attract new customers. Production techniques capable of quickly incorporating design changes are important capabilities for manufacturers who must respond to shifting consumer tastes.

In-line roller skates are made using several methods. One manufacturing method of interest is injection molding. Injection molding offers several benefits to manufacturers and consumers alike. For example, a relatively high level of quality control is possible for molded in-line roller skates. Additionally, the cost of molding in-line roller skates may be low, relative to other manufacturing techniques. Also, injection molding techniques are typically adaptable to automation and may include higher reliability factors than alternative manufacturing techniques.

Though in-line roller skate injection molding techniques offer advantages over other manufacturing techniques, injection molding is not without disadvantages. Traditionally, manufacturers developed molds and injection molding techniques to efficiently produce large numbers of identical goods. For example, molds were typically used to manufacture in-line roller skate models that included standard, fixed features with broad consumer appeal. Unfortunately, molds for producing these skates included mold cavities with fixed features that could not be readily modified to accommodate changing consumer preferences.

One potential way for a manufacturer to satisfy changing consumer preferences is to substitute a different mold in the mold machine each time the manufacturer produces a different model of skate. However, molds are relatively expensive and time-consuming to obtain. Consequently, consumer tastes may shift several times before a new mold is obtained, thereby rendering the new mold obsolete before it is even used.

The negative aspects of responding to consumer taste fluctuations by changing molds are more pronounced when consumer preferences are scattered among a wide variety of skate features. Manufacturers may attempt to satisfy scattered preferences by producing small batches of skate models with varied features. However, variable production costs tend to rise significantly when molds are repeatedly changed to fill small orders for different skate models. Furthermore, the physical act of substituting molds is labor intensive and may require lengthy production shutdowns.

SUMMARY OF THE INVENTION

The present invention includes a method of molding different versions of a skate component. The method comprises providing a single mold, the mold having a mold cavity capable of molding the skate component; attaching a first mold insert within the mold cavity to set a skate feature; injecting molding resin into the mold cavity, the mold cavity including the first mold insert, to form a first version of the skate component; replacing the first mold insert within the mold cavity with a second mold insert to change the skate feature; and injecting molding resin into the mold cavity, the mold cavity including the second mold insert, to form a second version of the skate component. The present invention also includes a method of producing a first skate with lacing apertures and a second skate free of lacing apertures, a method of configuring a skate component, and a mold for molding different versions of a skate component.

BRIEF DESCRIPTION OF THE DRAWINGS

FIG. 10 is a perspective view of one embodiment of a mold half of the present invention.

FIG. 11 is a sectional view taken along line 11—11 of FIG. 10.

FIG. 17 is a perspective view of another embodiment of a mold insert of the present invention.

FIG. 18 is a perspective view of another embodiment of a mold insert of the present invention.

FIG. 19 is a perspective view of another embodiment of a mold insert of the present invention.

FIG. 20 is a perspective view of another embodiment of a mold insert of the present invention.

DETAILED DESCRIPTION OF THE PREFERRED EMBODIMENTS

The present invention includes a method of molding different versions of a skate component using a single mold with a mold cavity, the method comprising attaching at least one mold insert within the mold cavity to set at least one feature of a plurality of skate features. The present invention also includes a mold for molding different versions of a skate component, the mold having a mold cavity and a plurality of mold inserts attached within the mold cavity, for setting at least one feature of a plurality of skate features.

Figure 1:
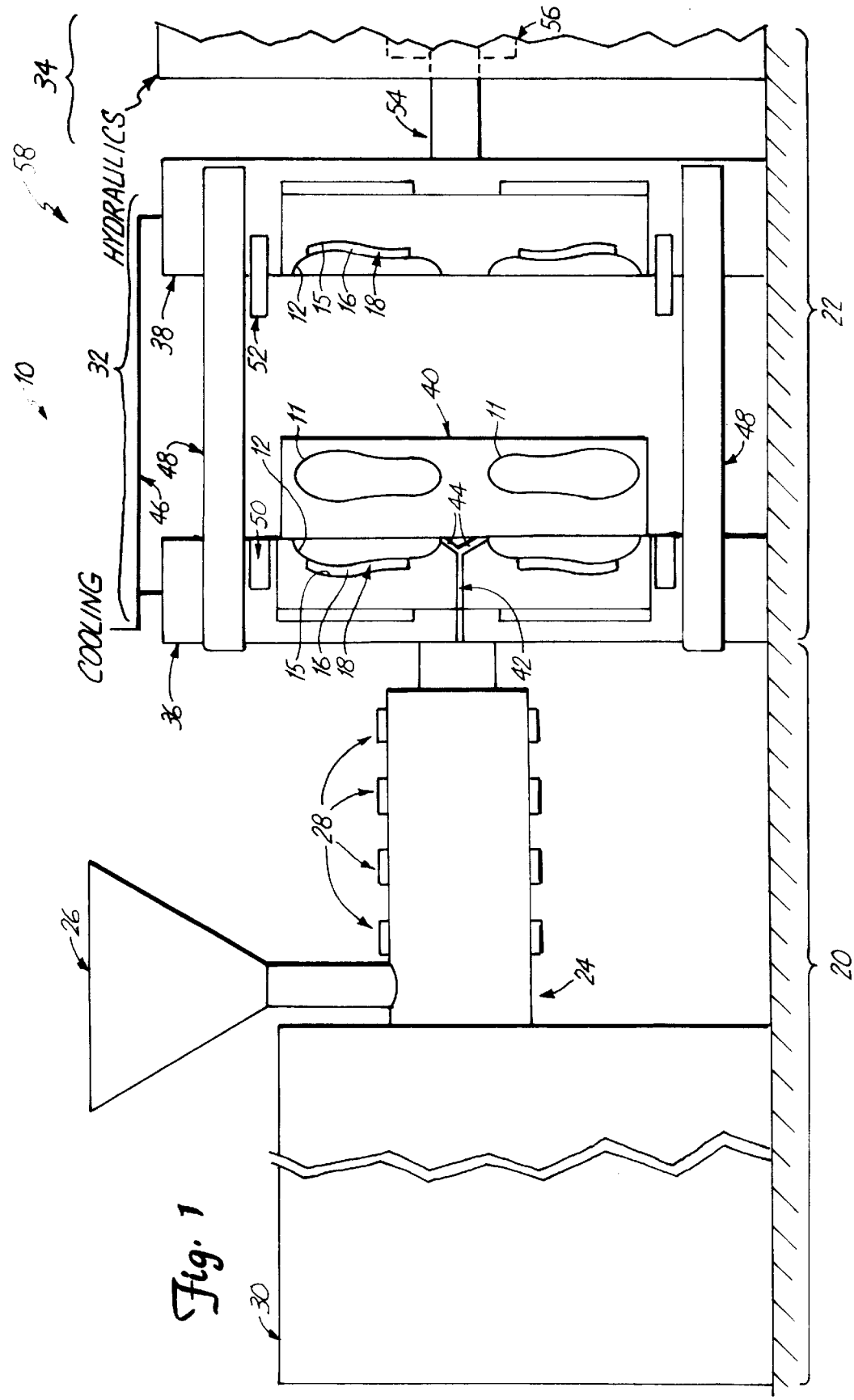
FIG. 1 is a schematic view of an injection molding machine with a mold for practicing embodiments of the method of the present invention.

In accordance with the method of the present invention, components of the skate are molded in a molding machine 10 that includes a plurality of inner and outer mold surfaces 11, 12, as in FIG. 1. When the molding machine 10 is closed, as in FIG. 2, the mold surfaces 11, 12 define a pair of mold cavities 14. The molding machine 10 includes a plurality of recessed surfaces 15, relative to the outer mold surfaces 12, that define a plurality of recesses 16. The recesses 16 are shaped to accept a plurality of respective mold inserts 18.

The mold inserts 18 shape the mold cavities 14 such that the features of the skate components may be changed by replacing any existing mold insert 18 with a new mold insert 18. For purposes of this disclosure, skate components with different features are considered to be different versions of the respective skate components. One version of the skate components with features defined by the mold surfaces 11, 12 and the existing mold inserts 18 is molded by injecting molding resin into the mold cavities 14 of the molding machine 10. The existing mold inserts 18 are then replaced in the mold cavities 14 by new mold inserts 18, and another version of the skate components with features defined by the mold surfaces 11, 12 and the new mold inserts 18 is molded by injecting molding resin into the mold cavities 14 of the molding machine 10.

Throughout the drawings, like elements will be referred to using like reference characters.

Figure 3:
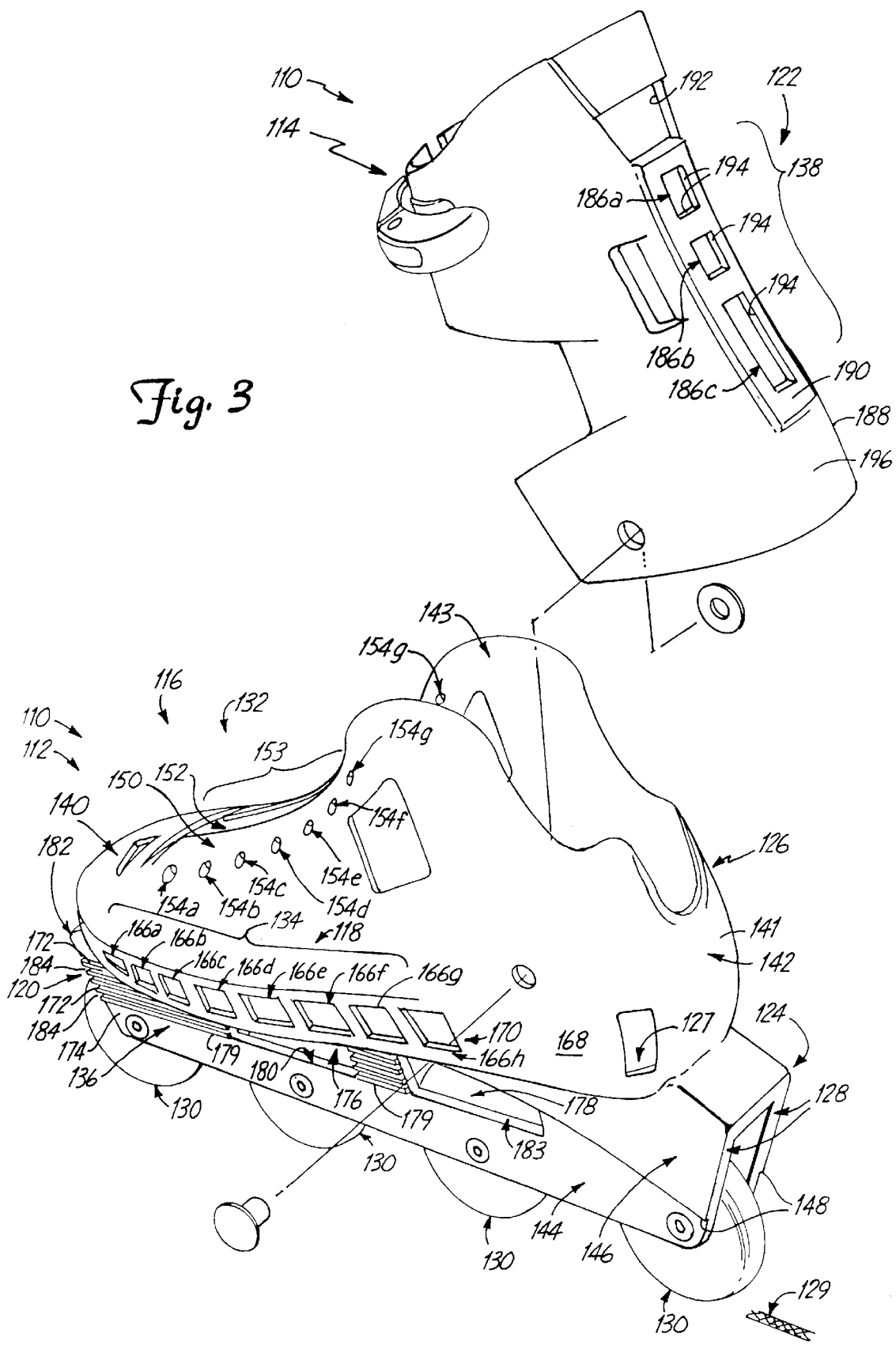
FIG. 3 is a perspective view of in-line roller skate component embodiments of the present invention.

Components of a skate molded according to the method of the present invention in molds having mold cavities and mold inserts are indicated generally at 110 in FIG. 3. Preferably, the skate is an in-line roller skate. One of the components 110 is an integrally molded boot and frame portion 112 and another of the components 110 is a molded cuff 114 of the in-line roller skate component 110. The molded boot and frame portion 112 includes three features 116, 118, 120, that are able to be individually or collectively changed, as desired, by replacing one or more of the mold inserts 18. The molded cuff 114 includes a fourth feature 122.

The integrally molded boot and frame portion 112 includes a molded wheel frame 124 and a molded boot 126. The molded cuff 114 is pivotally connected to the molded boot 126 in conventional fashion. The molded boot 126 includes a sole 127 and a liner (not shown) of conventional design. The wheel frame 124 is integrally connected to the sole 127 of the boot 126 and includes a pair of frame walls 128 that extend downward from the shell sole 127 toward a ground surface 129. The boot and frame portion 112 also includes a plurality of wheels 130 rotatably mounted in tandem fashion in a conventional manner between the walls 128 of the wheel frame 124.

The first feature 116 of the molded boot and frame portion 112 is a fastening section 132 which is located proximate an instep portion of the boot 126. The second feature 118 pertains to boot accent patterns 134 located on the boot 126 proximate the sole 127 on either side of the boot 126. The third feature 120 comprises frame accent patterns 136 located on the frame walls 128. The fourth feature 122 concerns a cuff accent pattern 138 located on a rear end of the cuff 114.

A front end of the boot 126 includes a toe section 140 and a rear end 141 of the boot 126 includes a heel section 142. The fastening section 132 extends from proximate the toe section 140 about 65% of the length of the boot 126 toward the heel section 142. The boot 126 also has a foot insertion aperture 143 that extends between the fastening section 132 and the rear end 141 of the boot 126.

The frame walls 128 each include a lower frame wall portion 144 and an upper frame wall portion 146. The lower and upper frame wall portions 144, 146 are substantially in alignment along an inside surface of each frame wall 128. Additionally, the lower and upper frame wall portions 144, 146 are integral with each other at a lower edge 148 of the upper frame wall portion 146. Each frame wall 128 is integral with and oriented substantially perpendicular with respect to the sole 127 along substantially the entire length of the sole 127.

Figure 4:
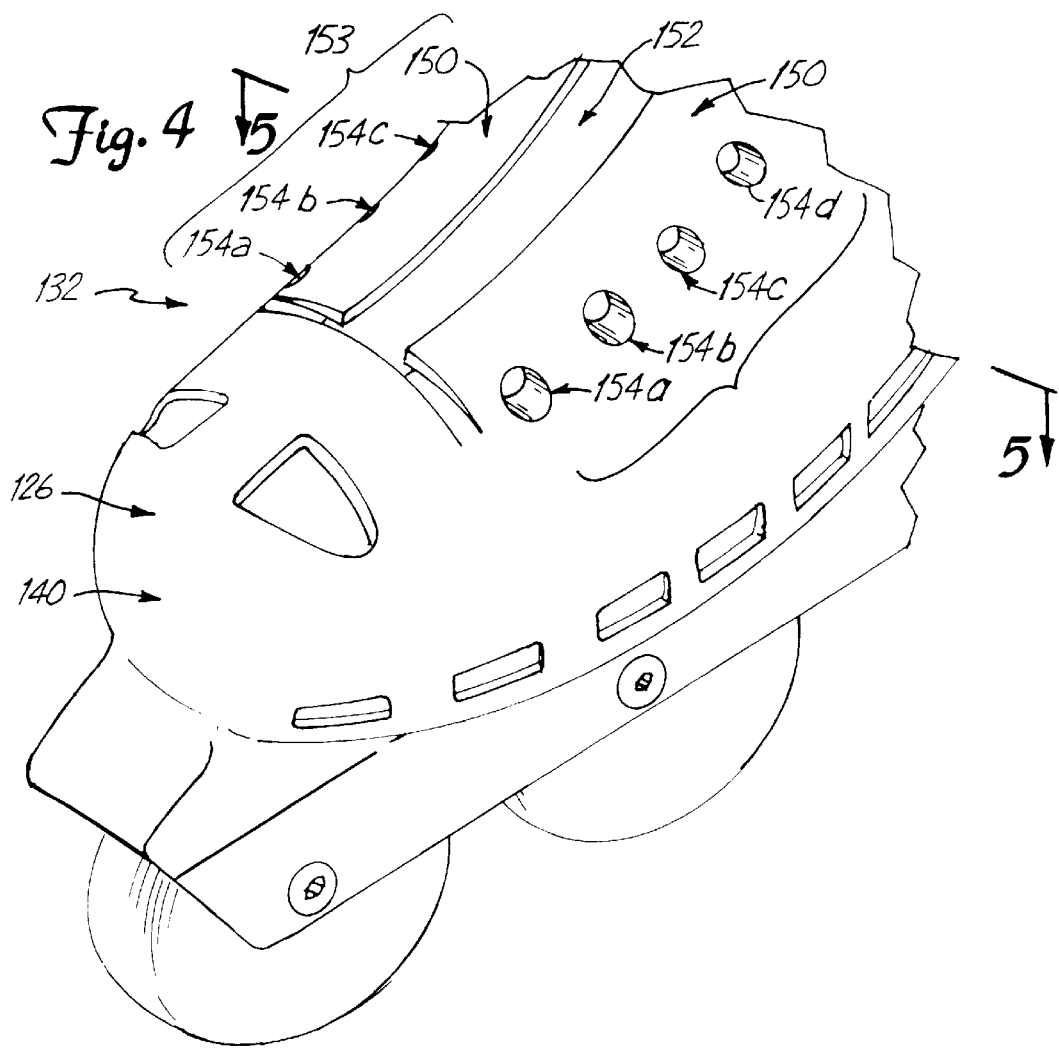
FIG. 4 is a partial perspective view of one embodiment of an in-line skate component of the present invention.

Referring to FIG. 4, the fastening section 132 of the boot 126 includes a pair of fastening flaps 150 that are separated by a space 152. The space 152, which is substantially shaped like a rectangular strip with a shallow bow inward with respect to the boot 126, starts proximate the toe section 140 of the boot 126 and ends proximate the foot insertion aperture 42, as best illustrated in FIG. 3. Referring to FIG. 4, the width of the space 152 varies slightly along the length of the space 152 as the flaps 150 variably flex toward and away from each other when the skate is fastened and unfastened.

Referring back to FIG. 3, the fastening flaps 150 include a fastening aperture pattern 153 that has a plurality of pairs of lacing apertures 154*a*–*g*. One aperture of each pair of lacing apertures 154*a*–*g* is located in one of the fastening flaps 150 and the other aperture of each respective pair of lacing apertures 154*a*–*g* is located in the other fastening flap 150. (Only one aperture of each pair of lacing apertures 154*a*–*g* is visible in FIG. 3). All comments about the pair of lacing apertures 154*c* also apply to the pairs of lacing apertures 154*a*, 154*b*, 154*d*, 154*e*, 154*f*, and 154*g*, unless otherwise noted.

Figure 5:
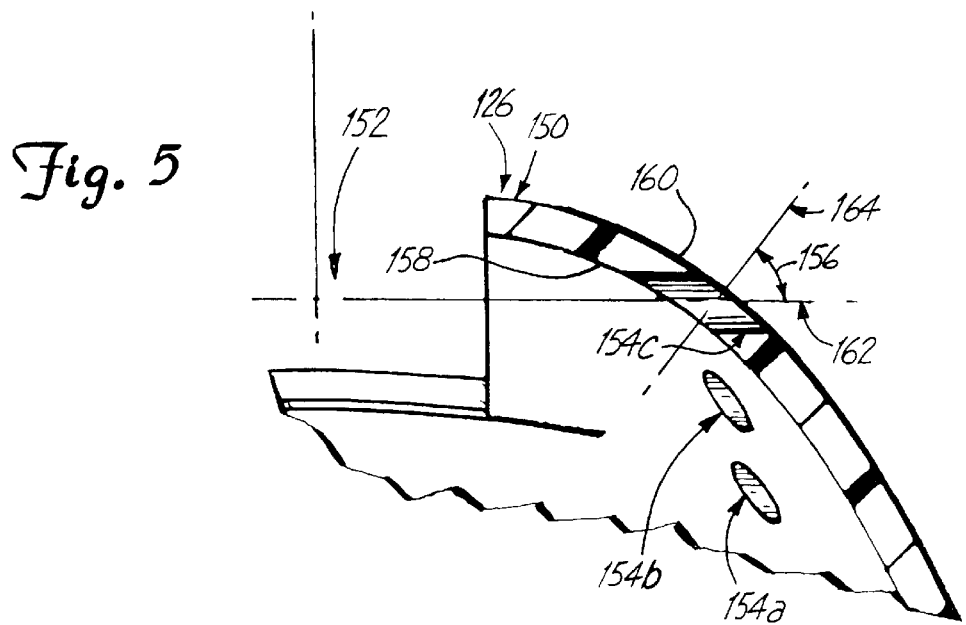
FIG. 5 is a partial sectional view taken along line 5—5 of FIG. 4.

As best illustrated in FIG. 5, each of the lacing apertures 154*c* is substantially cylindrical in shape and extends through the boot 126 at an angle 156 to inner and outer surfaces 158, 160 of the boot 126. The angle 156 is defined by a central longitudinal axis 162 that extends through each lacing aperture 154*c* between the inner and outer surfaces 158, 160 and by a line 164 oriented perpendicular to the inner and outer surfaces 158, 160 proximate each lacing aperture 154*c*.

The cross-sectional diameter of the lacing apertures 154*c*, taken normal to interior surfaces of each aperture 154*c*, is approximately 0.25 inches. The angles 156 of the respective apertures 154*a*–*g* vary from about 45° for the apertures 154*a* to about 10° for the apertures 154*g*. Referring back to FIG. 4 (only apertures 154*a*–*d* are shown in FIG. 4), each of the apertures 154*a*–*g* are roughly equidistant from the space 152, with the distance between the space 152 and the respective apertures 154*a*–*g* ranging from approximately 0.5 inches to approximately 0.7 inches.

Referring back to FIG. 3, the boot accent patterns 134 have a series of eight accent apertures 166*a*–*g*, spaced along long sides 168 of the boot 126 proximate the sole 127. Details are only provided for one of the boot accent patterns 134, though the details are substantially similar for the other of the boot accent patterns 134. The apertures 166*a*–*g* are arranged in single file fashion and extend from the toe section 140 of the boot 126 to a point 170 located approximately beneath a front side of the foot insertion aperture 143. The apertures 166*a*–*g* are substantially shaped like elongated rectangles proximate the toe section 140, but more closely approximate squares toward the point 170.

The frame accent patterns 136 of the frame walls 128 each comprise a plurality of ribs 172. Details are only provided for one of the frame accent patterns 136, though the details are substantially similar for the other of the frame accent patterns 136. The ribs 172 are of rectangular cross section and are attached to outside surfaces 174 of each lower frame wall portion 144. Each frame wall portion 144 additionally has a front accent aperture 176 and a rear accent aperture 178. (In FIG. 3, the ribs 172 and the apertures 176, 178 are visible on only one of the lower frame wall portions 144).

The frame accent pattern 136 and the front accent aperture 176 have substantially the same width such that a lower side 179 of the pattern 136 and a lower side 180 of the aperture 176 are substantially aligned. Also, an upper side (not shown) of the pattern 136 and an upper side (not shown) of the front accent aperture 176 are substantially aligned with each other and with the lower edge 148 of the upper frame wall portion 146. Though the width of the rear accent aperture 178 decreases about 40% from the front to the back of the aperture 178, a lower side 183 of the rear accent aperture 178 is substantially aligned with the sides 179, 180. Also, an upper side (not shown) of the rear accent aperture 178 abuts the lower edge 148 of the upper frame wall portion 146.

The ribs 172 of the frame accent pattern 136 are spaced apart in substantially parallel relationship to each other and extend from a front end 182 of the frame wall 128 to the front of the front accent aperture 176. The ribs 172 also extend from the rear of the front accent aperture 176 to the front of the rear accent aperture 178. The ribs 172 define and separate a plurality of elongated spaces 184 that are substantially rectangular in cross section.

The cuff accent pattern 138 has three accent apertures 186*a*–*c* spaced single file along a rear side 188 of the cuff 114. The apertures 186*a*–*c* are shaped substantially like rectangles. Each aperture 186*a*–*c* has substantially the same width. The length of the aperture 186*b* is relatively short such that the aperture 186*b* is nearly square in shape. The aperture 186*a* is about twenty-five percent (25%) longer than the aperture 186*b*. The aperture 186*c* is slightly longer than the combined lengths of the apertures 186*a* and 186*b*.

Starting at a raised outer surface 190 of the cuff 114 and ending at an inner surface 192 of the cuff 114, each interior surface 194 of each aperture 186*a*–*c* slopes inward toward the interior of each respective aperture 186*a*–*c* at approximately a uniform angle. The raised outer surface 190, which is shaped like an elongated rectangle, fully encompasses the apertures 186*a*–*c* and is elevated about 0.060 inch with respect to a base outer surface 196 of the cuff 114.

Figure 6:
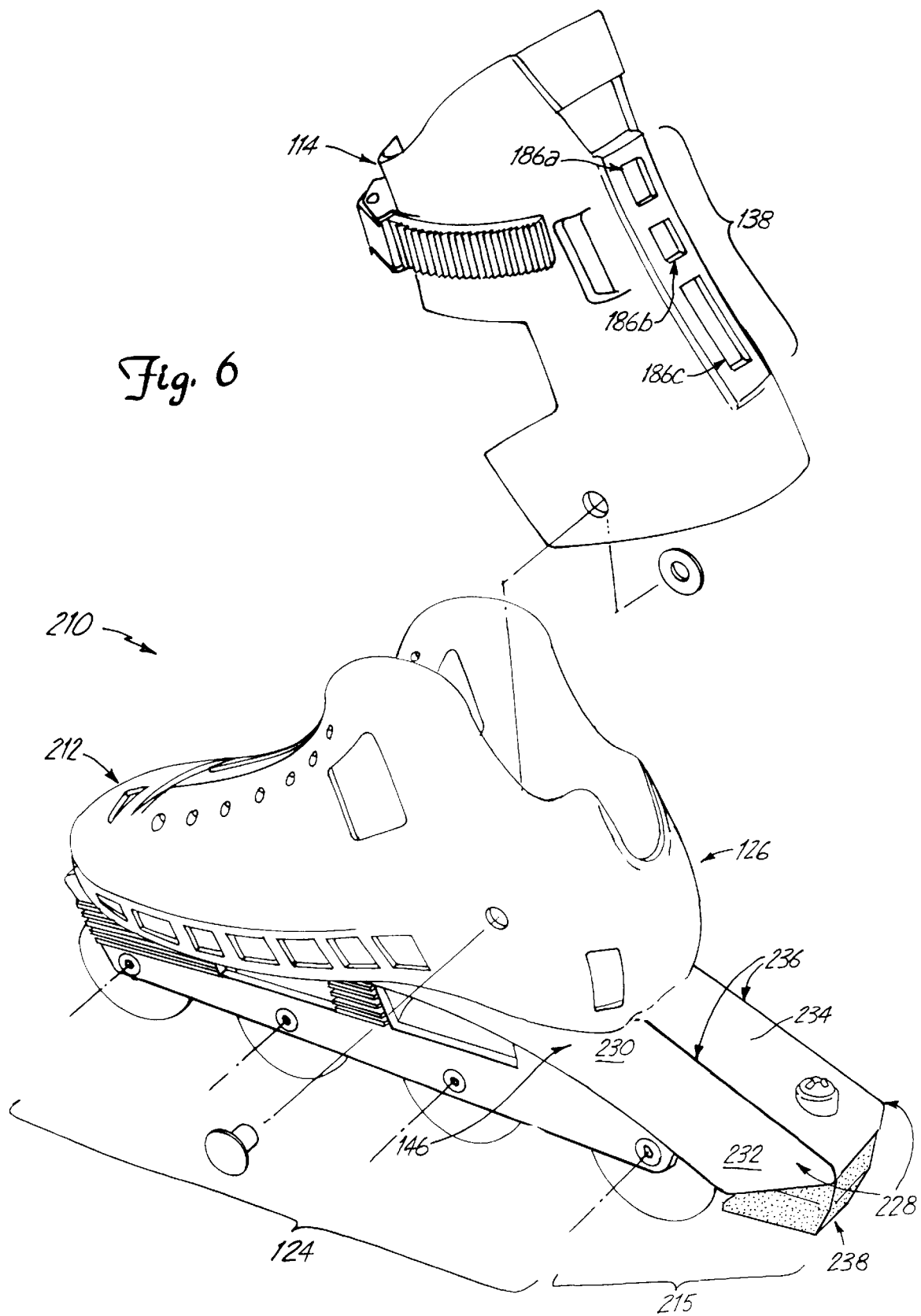
FIG. 6 is a perspective view of an additional in-line roller skate component embodiment of the present invention.

Another component of the skate molded according to the method of the present invention is illustrated generally at 210 in FIG. 6. The component 210 is an integrally molded boot and frame portion 212. The molded boot and frame portion 212 includes the molded wheel frame 124 and the molded boot 126 previously described with reference to the molded boot and frame portion 112 of FIG. 3. The molded boot and frame portion 212 additionally includes a molded brake frame 215 as in FIG. 6.

The brake frame 215 and the wheel frame 124 are integrally molded such that a pair of frame walls 228 of the brake frame 215 are extensions of the upper frame wall portions 146 of the embodiment of FIG. 3. Additionally, outside surfaces 230 of the upper frame wall portions 146 and outside surfaces 232 of the frame walls 228, respectively, join to make substantially smooth, unbroken surfaces. The brake frame 215 also includes a cover plate 234 that is integral with and extends between upper edges 236 of the frame walls 228. A replaceable brake pad 238 is releasably attached to the brake frame 215 between the frame walls 228 by a conventional attachment technique.

Figure 7:
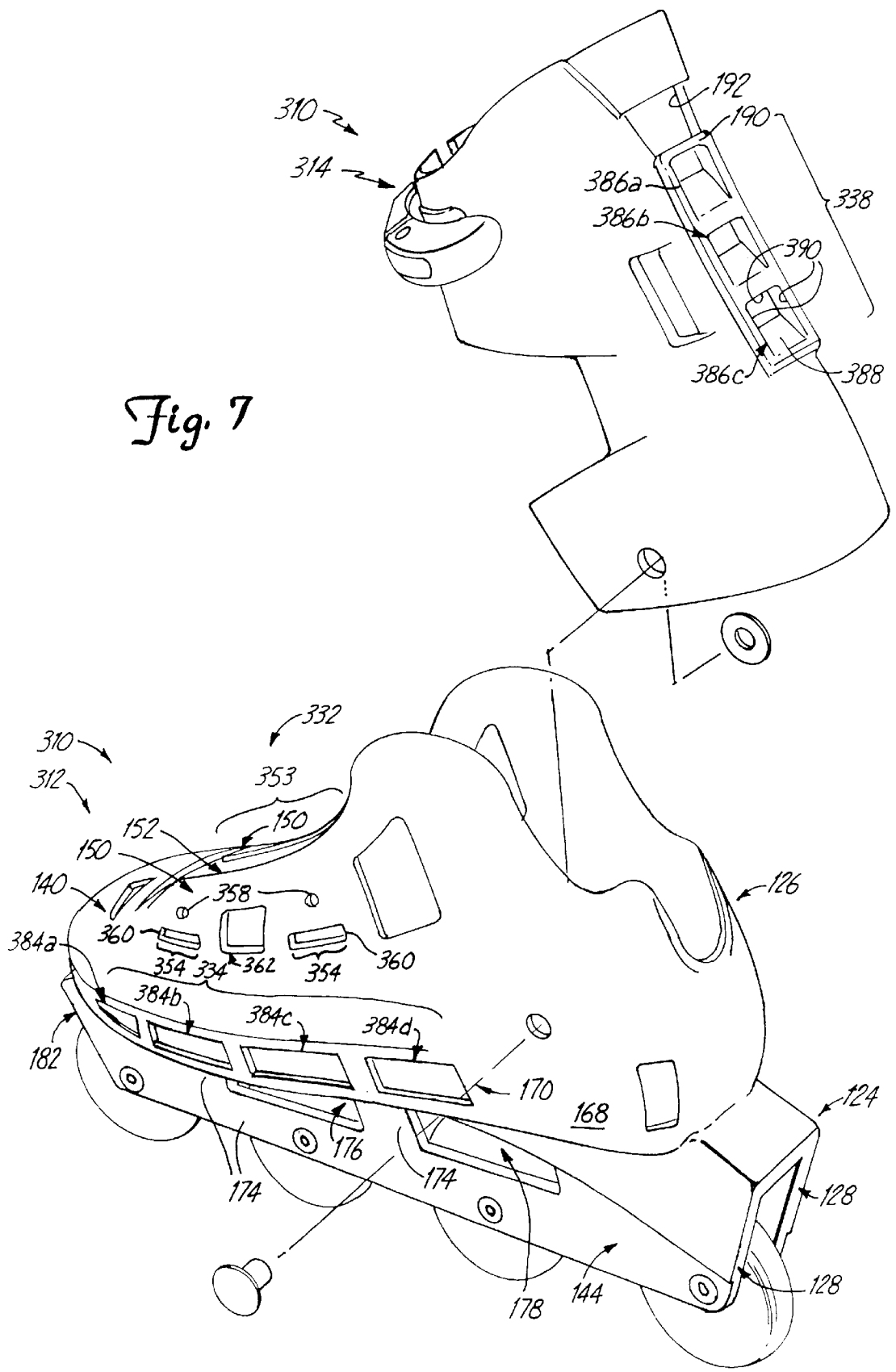
FIG. 7 is a perspective view of additional in-line roller skate component embodiments of the present invention.

Additional components of the skate molded according to the method of the present invention are indicated generally at 310 in FIG. 7. One of the components 310 is an integrally molded boot and frame portion 312 and another of the components 310 is a molded cuff 314. The molded boot and frame portion 312 includes the molded wheel frame 124 and the molded boot 126 of the molded boot and frame portion 112 of FIG. 3. However, the molded boot and frame portion 312 includes a fastening section 332 in place of the fastening section 132 and a boot accent pattern 334 in place of the boot accent pattern 134. Additionally, the molded boot and frame portion 312 does not include the frame accent pattern 136 of FIG. 3. The cuff 314 is substantially similar to the cuff 114 illustrated in FIG. 3, except that a cuff accent pattern 338 replaces the cuff accent pattern 138 of FIG. 3.

Figure 8:
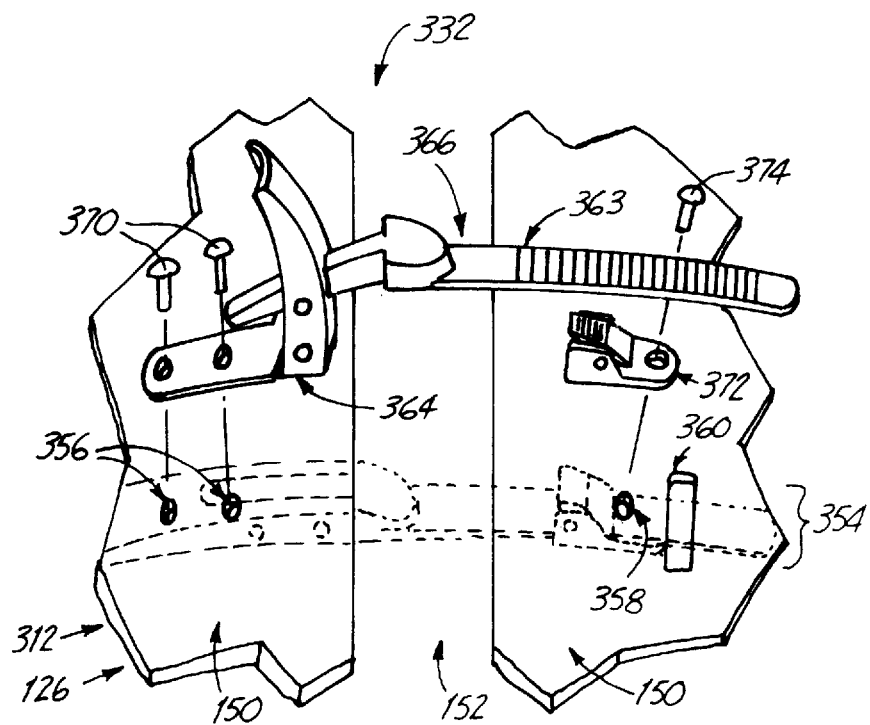
FIG. 8 is a partial exploded perspective view of one embodiment of an in-line roller skate component of the present invention.

The fastening section 332 differs from the fastening section 132 of the molded boot and frame portion 112 in that the fastening flaps 150 include a fastening aperture pattern 353 that has a pair of buckle aperture sets 354 instead of fastening aperture pattern 153 that has the pairs of lacing apertures 154*a*–*g*. As best illustrated in FIG. 8, each buckle aperture set 354 has buckle apertures, such as a pair of left cylindrical apertures 356, in one of the fastening flaps 150. Additionally, each buckle aperture set 354 has a right cylindrical aperture 358 and a rectangular slot 360 in the other of the fastening flaps 150. The right cylindrical aperture 358 is preferably located between the rectangular slot 360 and the space 152. Additionally, referring back to FIG. 7, each flap 150 has an accent aperture 362 located approximately between the rectangular slots 360 of each flap 150.

The fastening section 332, as illustrated in FIG. 8, includes a spring-biased lever 364 and a pivotally attached buckle strap 366 with teeth 368. The spring-biased lever 366 is fixedly attached to the boot 126 by rivets 370 that extend through the left cylindrical apertures 356. Additionally, a ratchet catch 372, for releasably gripping the teeth 368 of the buckle strap 366, is fixedly attached to the boot 126 by a rivet 374 that extends through the right cylindrical aperture 358.

Figure 9:
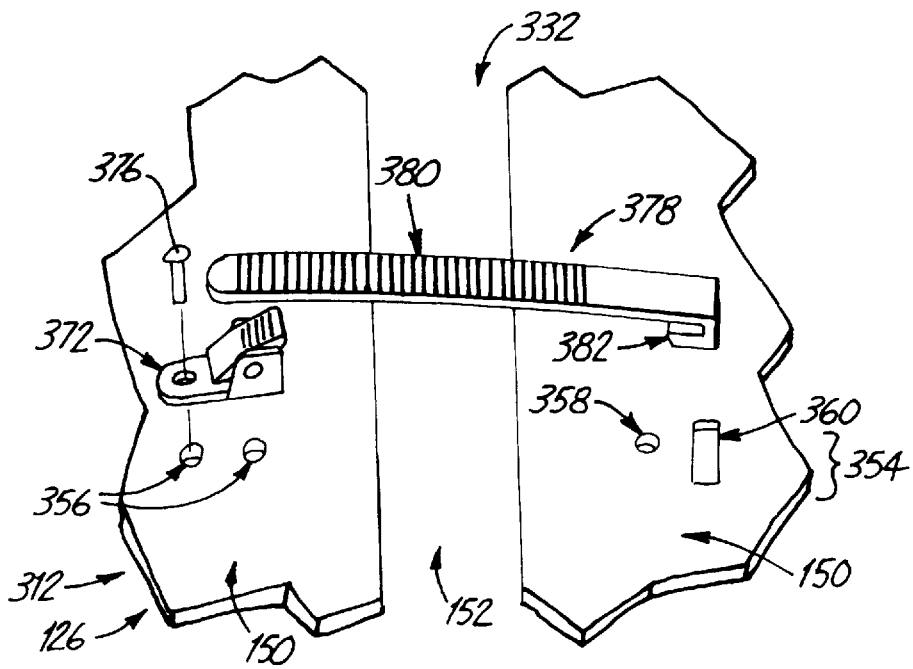
FIG. 9 is a partial exploded perspective view of one embodiment of an in-line roller skate component of the present invention.

Alternatively, as illustrated in the fastening section 332 embodiment of FIG. 9, the ratchet catch 372 may be attached to the boot 126 by a rivet 376 that extends through either of the left cylindrical apertures 356. Additionally, the fastening section 332 of the embodiment of FIG. 9 includes a buckle strap 378 with teeth 380, which are releasably gripped by the catch 372. The buckle strap 378 also includes a hook portion 382 that is inserted through the elongated rectangular slot 360 such that the hook portion 382 engages the rectangular slot 360.

Referring back to FIG. 7, the boot accent pattern 334 is similar to the boot accent pattern 134 of the boot 126. However, the boot accent pattern 334 differs from the boot accent pattern 134 in that the boot accent pattern 334 has a series of four accent apertures 384a–d spaced along the long side 168 of the boot 126 proximate the sole 127 instead of the eight accent apertures 166a–g. As described with respect to the apertures 166a–g, the apertures 384a–d are arranged in single file fashion and extend from the toe section 140 of the boot 126 to the point 170. Each of the apertures 384a–d are shaped somewhat like elongated rectangles.

The boot and frame portion 312 does not include the frame accent pattern 136 of the boot and frame portion 112 of FIG. 3. Instead of the ribs 172 and elongated spaces 184, only the outside surface 174, referring to FIG. 7, exists between the front end 182 of the frame walls 128 and the front accent apertures 176 and also between the front accent apertures 176 and the rear accent apertures 178. The outside surface 174 is substantially smooth and flat over the entire lower frame wall portion 144 of each frame wall 128.

The cuff accent pattern 338 is similar to the cuff accent pattern 138 of the cuff 114 in that the cuff accent pattern 338 and the cuff accent pattern 138 have three accent apertures 386a–c and three accent apertures 186a–c, respectively. Additionally, the cuff 114 includes the rectangular-shaped, raised outer surface 190 that fully encompasses the apertures 386a–c. However, the apertures 386a–c differ from the apertures 186a–c in that the apertures 386a–c, unlike the apertures 186a–c, are each substantially equal in size and shape.

Additionally, each aperture 386a–c includes a lower side 388 that, starting at the raised outer surface 190 and ending at the inner surface 192 of the cuff 114, slopes inward toward the interior of the respective apertures 386a–c at a substantially shallower angle than other sides 390 of the apertures 386a–c. The surface area of the lower side 388 substantially exceeds the surface area of each respective side 390, taken individually.

Referring back to FIG. 1, the molding machine 10 is preferably a reciprocating screw injection molding machine. The molding machine 10 includes an injection portion 20 and a clamping portion 22. The injection portion 20 includes a barrel 24 that contains a reciprocating screw (not shown) and a hopper 26 that directs pelletized plastic resin (not shown) to the screw. The injection portion 20 also includes a plurality of heater bands 28 arranged around the barrel 24 to melt the plastic resin. Additionally, the injection portion 20 includes a hydraulic power unit 30 that rotates and reciprocates the screw.

The clamping portion 22 includes a mold portion 32 and a drive portion 34 that opens and closes the mold portion 32. The mold portion 32 includes a fixed outer mold half 36 that is in fixed association with the screw. The mold portion 32 also includes a movable outer mold half 38 in mateable association with the fixed outer mold half 36. Additionally, the mold portion 32 includes a moveable inner mold core 40 that is located between and in mateable association with the fixed and moveable outer mold halves 36, 38.

Figure 2:
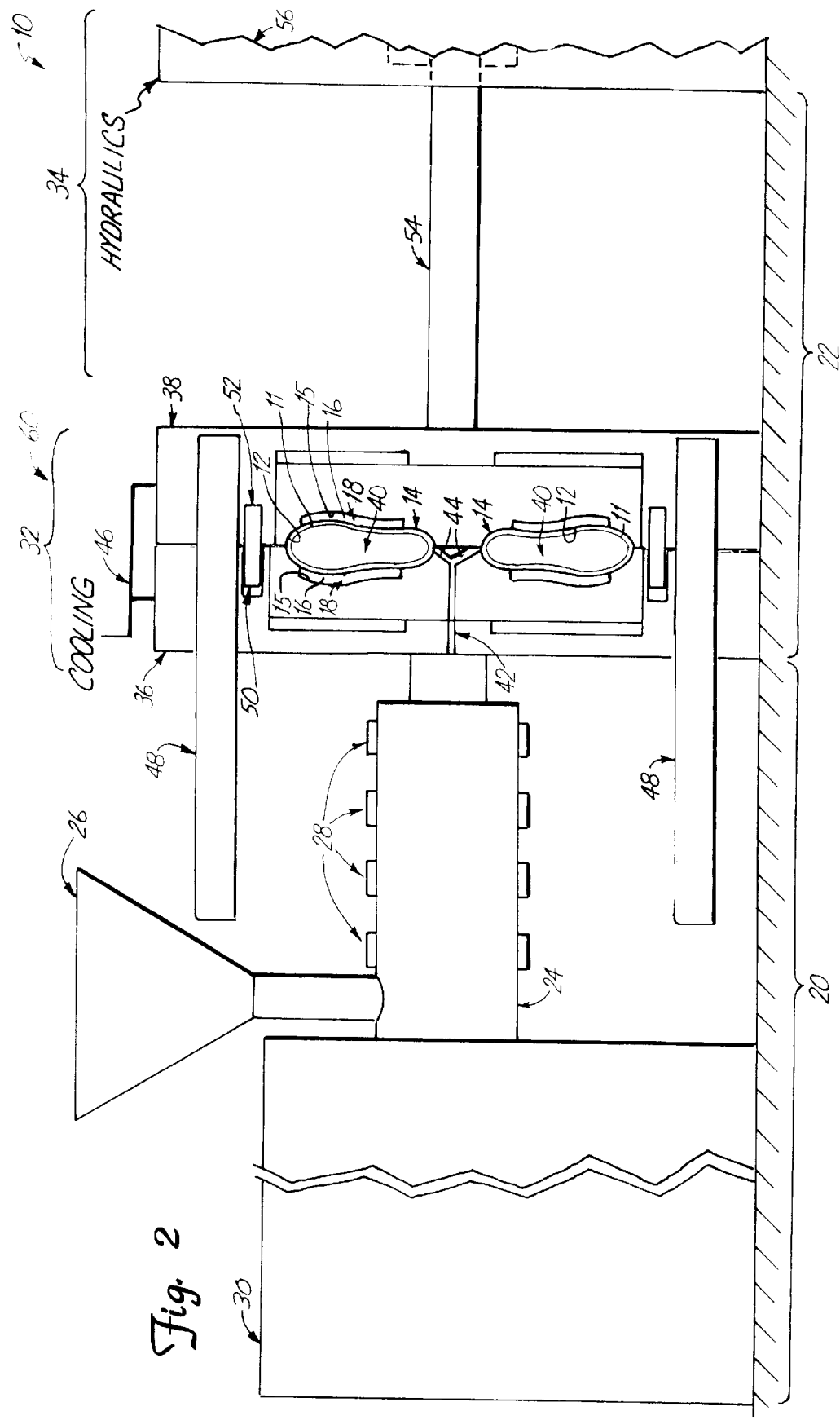
FIG. 2 is a schematic view of an injection molding machine with a mold for practicing embodiments of the method of the present invention, with the mold closed to form a mold cavity.

During the molding operation, the inner mold core 40 is clamped between and fully enclosed by the fixed and moveable outer mold halves 36, 38, as best illustrated in FIG. 2. Together, the mold halves 36, 38 and the mold core 40 cooperatively define the inner mold surfaces 11 and the outer mold surfaces 12 of the mold cavities 14. In one embodiment, one of the mold cavities 14 molds the boot and frame portion 112 of FIG. 3 and the other of the mold cavities 14 molds the boot and frame portion 212 of FIG. 6. Preferably, the boot 126 of the boot and frame portion 112 is configured for a left foot of a person (not shown) and the boot 126 of the boot and frame portion 212 is configured for a right foot of a person (not shown).

The fixed mold half 36 and the mold core 40 have a sprue 42 that is in fluid communication with the injection unit 20 and additionally include branches 44 which place the injection unit 20 and the sprue 42 in fluid communication with each mold cavity 14. The mold portion 32 also includes a plurality of cooling lines 46 oriented within the mold halves 36, 38 to cool melted resin after injection of melted resin into the mold cavities 14 is complete. Each mold half 36, 38 includes the one half of the recessed surfaces 15, recessed relative to the outer mold surfaces 11, that define the recesses 16. The recesses 16 are shaped to accept the respective mold inserts 18 for shaping the mold cavities 14. The plurality of inserts 18 are removably inset within respective recesses 16 for selectively changing particular features, such as any of the first, second and third features 116, 118, 120 of the molded boot and frame portion 112 of FIG. 3.

The drive portion 34 of the clamping unit 22, as in FIG. 2, includes a plurality of tie bars 48 that help maintain the moveable outer mold half 38 in mateable alignment with the fixed outer mold half 36. Also, the fixed outer mold half 36 includes cylindrical female guides 50 and the moveable outer mold half 38 includes cylindrical male members 52 that slidably engage respective cylindrical female guides 50. The guides 50, 52 help maintain proper alignment of the fixed and moveable outer mold halves 36, 38 relative to each other and relative to the inner mold core 40.

The drive portion 34 also includes a hydraulic ram 54 disposed in working relationship with the outer mold half 38 and the inner mold core 40. The drive portion 34 further includes a hydraulic power unit 56 that drives the hydraulic ram 54 and places the mold portion 32 either in an open condition 58 as in FIG. 1 or in a closed position 60 to form the cavities 14 as in FIG. 2. In one embodiment, the mold halves 36, 38 and the inner mold core 40 are made of a low carbon plastic mold steel such as Series P20 tool steel. The molding machine 10 of one embodiment is preferably a Model 500 MG injection molding machine available from Mitsubishi Heavy Industries, LTD of Tokyo, Japan. The plastic resin is preferably a molding resin, such as Himont TPO-45A-C modified polypropylene synthetic resin alloy. Himont TPO-45A-C resin alloy is available from Himont Advanced Materials Company of Lansing, Mich.

Referring to FIG. 10, the moveable outer mold half 38 of the machine 10 includes a frame 62 and a cavity base 64 held within the frame 62. Details relating to the mold inserts 18 and attachment of the inserts 18 within the mold halves 36, 38 of FIG. 1 are only provided for the moveable outer mold half 38, though the details are substantially similar for the fixed outer mold half 36.

Figure 12:
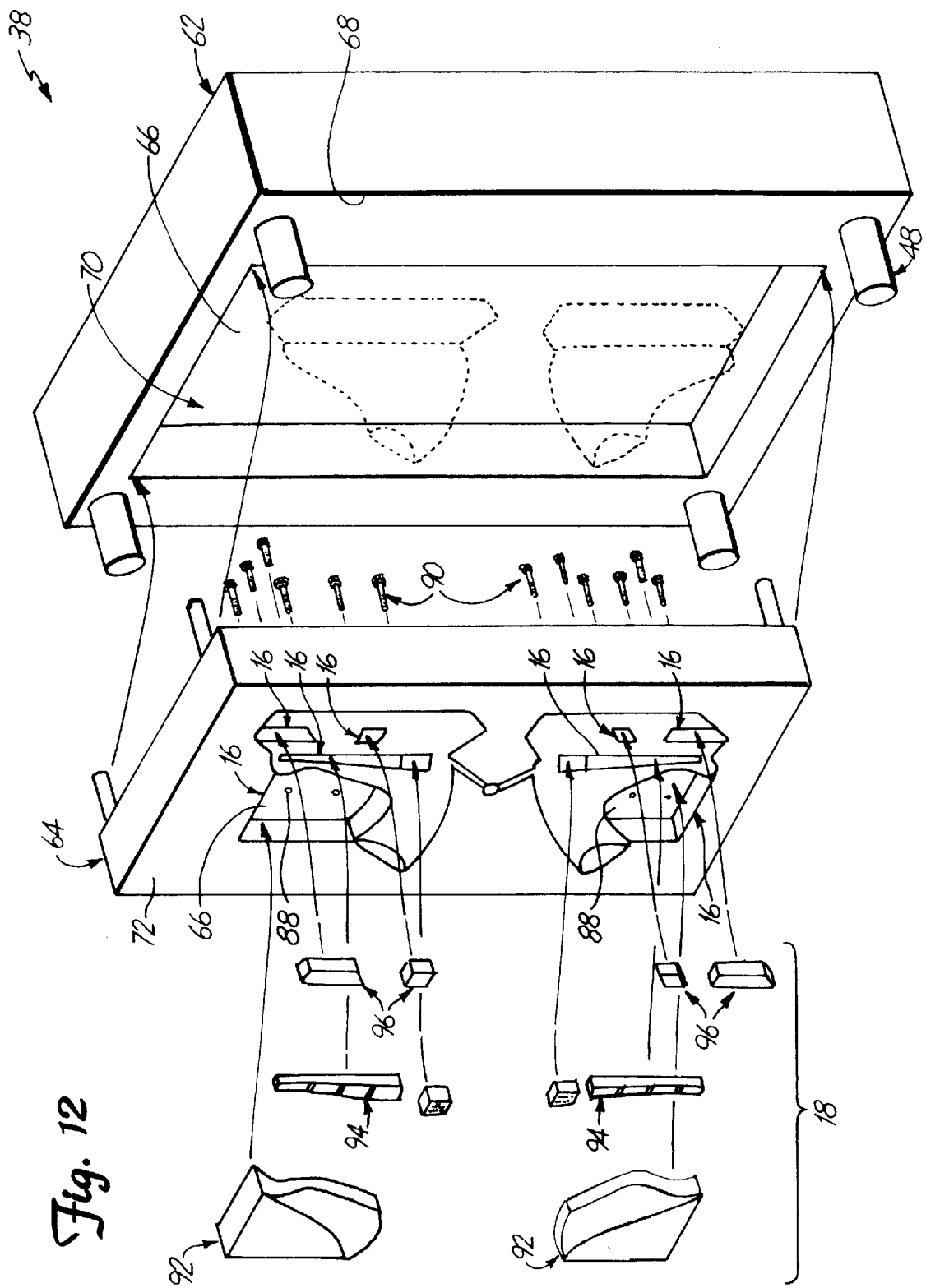
FIG. 12 is an exploded perspective view of one embodiment of a mold half of the present invention.

As best illustrated in FIG. 12, the frame 62 is rectangular in shape and includes depressed surfaces 66 that are recessed relative to outer surface 68 of the frame 62. The depressed surfaces 66 define a rectangular-shaped recess 70 within the frame 62. The cavity base 64, which is also rectangular-shaped, is slightly smaller than the recess 70 such that the cavity base 64 slidably fits within the recess 70.

When the cavity base 64 is positioned within the recess 70, an outer surface 72 of the cavity base 64 is substantially co-planar with the outer surface 68 of the frame 62, as best illustrated in FIG. 11. The mold half 38 includes threaded bores 74 that extend from a rear surface 76 of the frame 62, through the frame 62, and into the cavity base 64. The cavity base 64 is fixed within the frame 62 by bolts 78 that are threaded into the bores 74.

The cavity base 64 also includes depressed surfaces 80 that are recessed relative to a rear outer surface 82 of the cavity base 64. The depressed surfaces 80 define a recess 84 within the cavity base 64. The cavity base 64 includes the recessed surfaces 15 that define the recesses 16. The mold inserts 18 are slidably inserted within the recesses 16 of the cavity base 64 such that molding surfaces 86 of the inserts 18 are disposed in molding association with the outer mold surfaces 12 of the mold cavities 14. A plurality of threaded bores 88 extend from the recess 84 through the cavity base 64 and into the mold inserts 18, respectively. Each mold insert 18 is held in the respective recesses 16 of the cavity base 64 by bolts 90 that threadably engage the bores 88 within the mold inserts 18.

One of the mold inserts 18 is a fastening section insert 92, as in FIG. 12, which may be replaced to change the first feature 116 of the molded boot and frame portion 112 of FIG. 3, namely the fastening section 132. Another of the mold inserts 18 is a boot accent pattern insert 94, as in FIG. 12, which may be replaced to change the second feature 118 of the molded boot and frame portion 112, the boot accent pattern 134. Another of the mold inserts 18 includes frame accent pattern inserts 96, as in FIG. 12, which may be replaced to change the third feature 120 of the molded boot and frame portion 112, the frame accent pattern 136.

Figure 13:
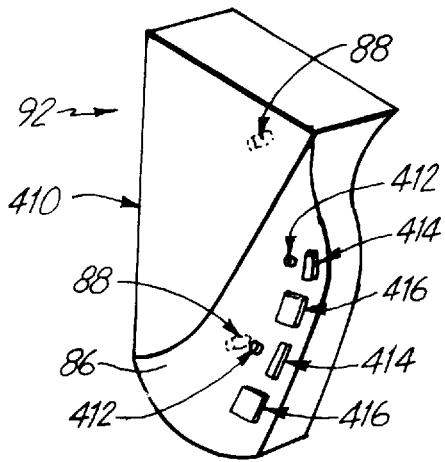
FIG. 13 is a perspective view of one embodiment of a mold insert of the present invention.

The fastening section insert 92, referring to FIG. 13, may take the form of a buckle aperture insert 410. The buckle aperture insert 410 includes cavity patterns 412 for shaping the right cylindrical apertures 358 and cavity patterns 414 for shaping the elongated rectangular slots 360, referring to FIG. 7, of the buckle aperture sets 354. Alternatively, as in FIG. 14, the fastening section insert 92 may comprise a lace aperture insert 420 as in FIG. 14. The lace aperture insert 420 includes cavity patterns 422 for forming the lacing apertures 154a–g of one of the fastening flaps 150 as in FIG. 3.

Figure 14:
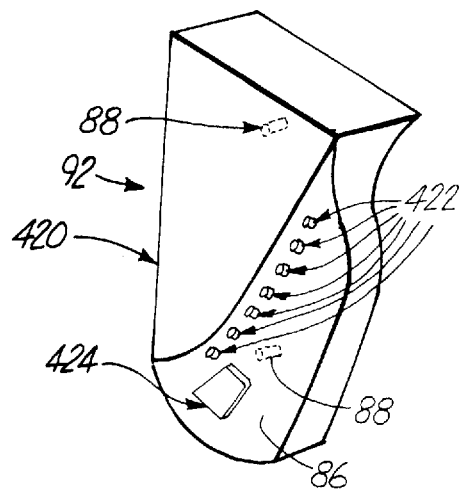
FIG. 14 is a perspective view of another embodiment of a mold insert of the present invention.

Replacement of the buckle aperture insert 410 of FIG. 13 with the lace aperture insert 420 of FIG. 14 within the respective recess 16 of FIG. 12 facilitates a switch from the fastening section 332 of the boot and frame portion 312 of FIG. 7 to the fastening section 132 of the boot and frame portion 112 of FIG. 3. Replacement of the lace aperture insert 420 of FIG. 14 with the buckle aperture insert 410 of FIG. 13 in the respective recess 16 of FIG. 12 facilitates a switch from the fastening section 132 of the boot and frame portion 112 of FIG. 3 to the fastening section 332 of the boot and frame portion 312 of FIG. 7.

Figure 15:
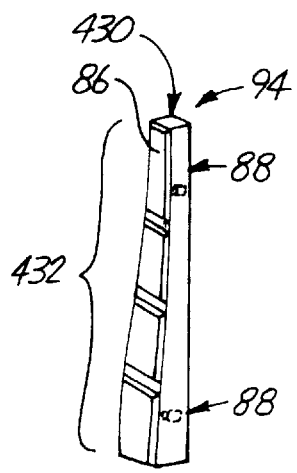
FIG. 15 is a perspective view of another embodiment of a mold insert of the present invention.

Referring to FIG. 15, the boot accent pattern insert 94 may take the form of a four aperture insert 430. The four aperture insert 430 includes a cavity pattern 432 for forming the accent apertures 384a–d of the boot and frame portion 312 as in FIG. 7. Alternatively, as in FIG. 16, the boot accent pattern insert 94 may take the form of an eight aperture insert 440. The eight aperture insert 440 includes a cavity pattern 442 for forming the accent apertures 166a–g of the boot and frame portion 112 as in FIG. 3.

Figure 16:
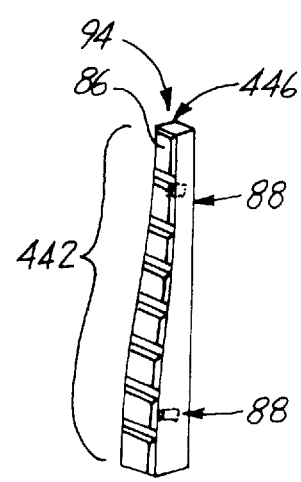
FIG. 16 is a perspective view of another embodiment of a mold insert of the present invention.

Replacement of the four aperture insert 430 of FIG. 15 with the eight aperture insert 440 of FIG. 16 within the respective recess 16 of FIG. 12 facilitates a switch from the boot accent pattern 334 of the boot and frame portion 312 of FIG. 7 to the boot accent pattern 134 of the boot and frame portion 112 of FIG. 3. Alternatively, replacement of the eight aperture insert 440 of FIG. 16 with the four aperture insert 430 of FIG. 15 in the respective recess 16 of FIG. 12 facilitates a switch from the boot accent pattern 134 of the boot and frame portion 112 of FIG. 3 to the boot accent pattern 334 of the boot and frame portion 312 of FIG. 7.

The frame accent pattern inserts 96 may take the form of a set of plain inserts 450 as in FIG. 17 or a set of ribbed inserts 460 as in FIG. 18. Referring to FIG. 18, the molding surfaces 86 of the plain inserts 450 are substantially smooth and flat such that the molding surfaces 86 and the outer mold surfaces 12 form a smooth, continuous surface, as best illustrated in FIG. 11. The plain inserts 450 of FIG. 18 are inserted within the respective recesses 16 of FIG. 12 to mold the lower frame wall portion 144 with a single plain surface such as the outside surface 174, as in FIG. 7. The ribbed inserts 460 of FIG. 18 include cavity patterns 462. The cavity patterns 462 are shaped for forming the frame accent pattern 136 of the boot and frame portion 112 of FIG. 3.

Replacement of the set of plain inserts 450 of FIG. 17 with the set of ribbed inserts 460 of FIG. 18 within the respective recesses 16 of FIG. 12 facilitates addition of the frame accent pattern 136 and the ribs 172 to the lower frame wall 144 of the wheel frame 124, as in FIG. 3. Replacement of the set of ribbed inserts 460 of FIG. 18 with the set of plain inserts 450 of FIG. 17 within the respective recesses 16 of FIG. 12 facilitates removal of the frame accent pattern 136 and the ribs 172 from the wheel frame 124 of FIG. 3 to leave the outside surface 174 of the lower frame wall portion 144, as in FIG. 7.

Figure 21:
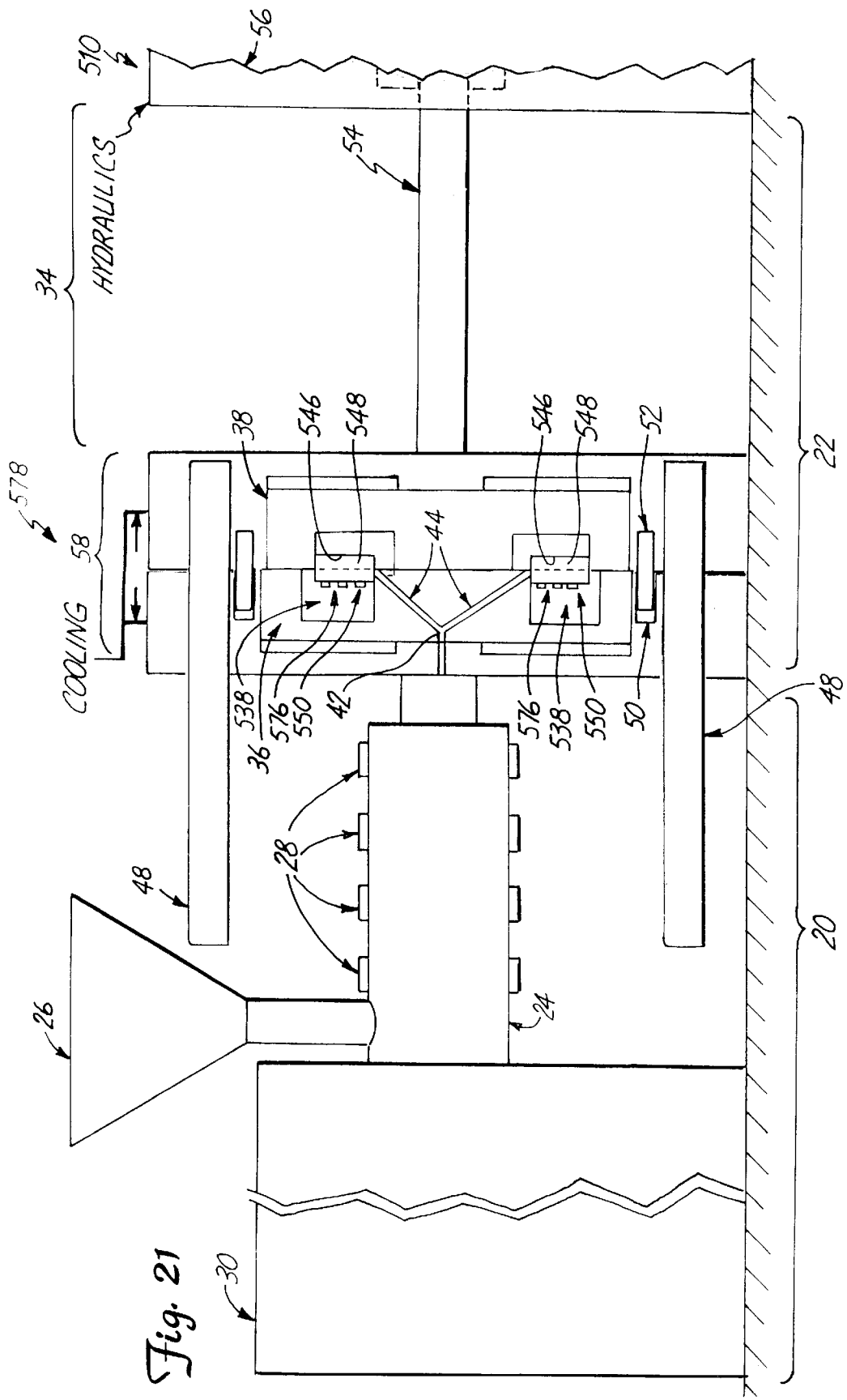
FIG. 21 is a schematic view of an injection molding machine with a mold for practicing embodiments of the method of the present invention, with the mold closed to form a mold cavity.

Another reciprocating screw injection molding machine for practicing the method of the present invention is illustrated generally at 510 in FIG. 21. The molding machine 510 is similar to the molding machine 10 of FIG. 1 except that the molding machine 510 of FIG. 21 does not include the movable inner mold core 40. Additionally, neither the fixed outer mold half 36 or the movable outer mold half 38 of the molding machine 510 of FIG. 21 include the recesses 16 or the inserts 18 of the molding machine 10 of FIG. 1. Instead, referring to FIG. 21, the fixed outer mold half 36 of the molding machine 510 includes at least one cavity 538 for forming the molded cuff 114 of FIG. 3 or the cuff 314 of FIG. 7. Preferably, the fixed outer mold half 36 includes four cavities 538. Additionally, the movable outer mold half 38 has a plurality of depressed surfaces 546, as in FIG. 21, which define a plurality of recesses 548 in the mold half 38. The mold half 38 also includes a plurality of inserts 550 that are removably inset within respective recesses 548 for selectively configuring the mold cavity 538. The mold cavity 538 may be configured, by changing the inserts 550, to mold the cuff 114 with the cuff accent pattern 138 of FIG. 3 or to mold the cuff 314 with the cuff accent pattern 338 of FIG. 7.

Figure 22:
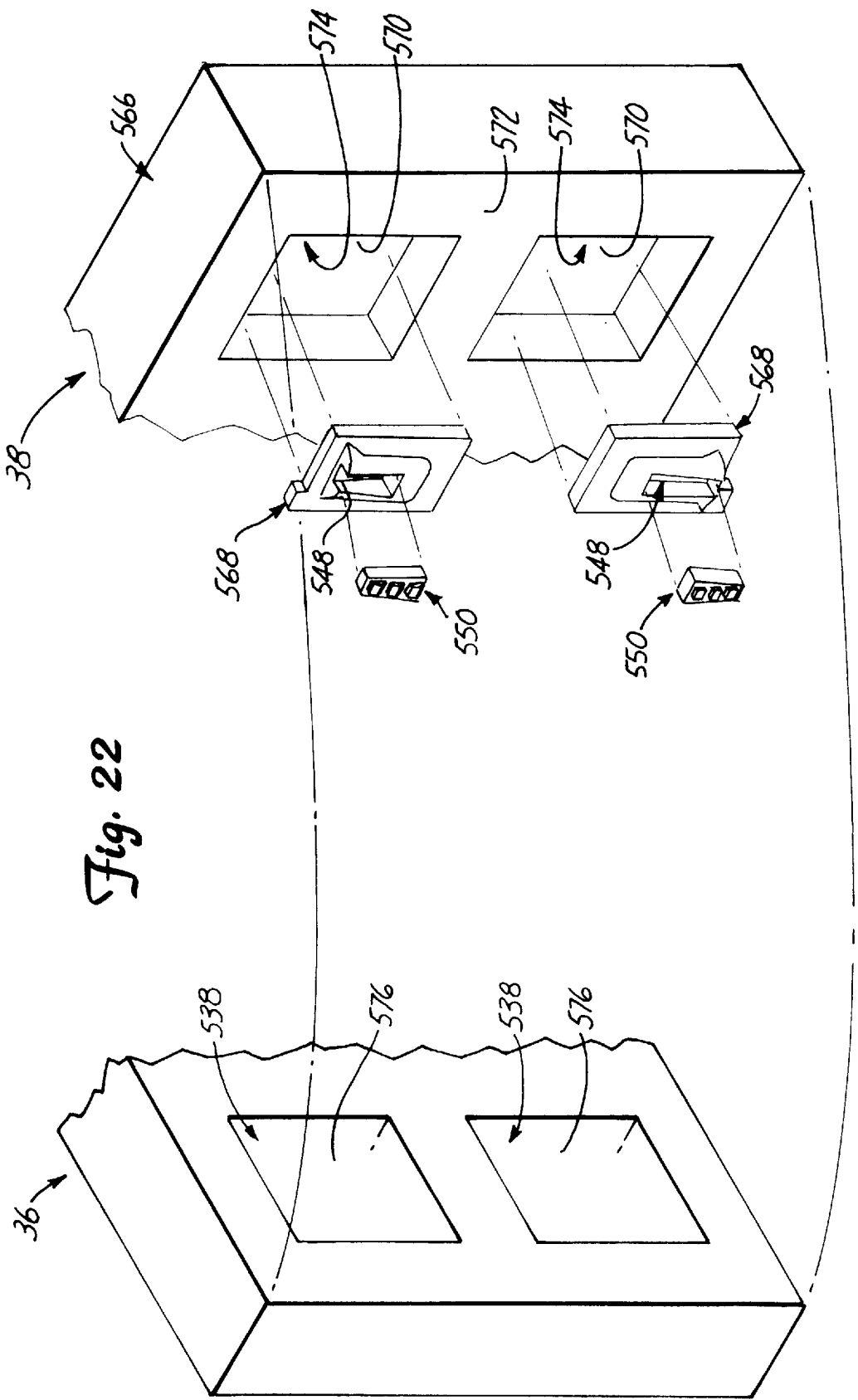
FIG. 22 is an exploded perspective view of one embodiment of a mold of the present invention.

The movable outer mold half 38, as in FIG. 22, includes a frame 566 and an insert base 568 held within the frame 566. The frame 566 is rectangular in shape and includes depressed surfaces 570 which are recessed relative to an outer surface 572 of the frame 566. The depressed surfaces 570 define a plurality of rectangular-shaped recesses 574 within the frame 566. In one preferred embodiment, the frame 566 has four recesses 574 for accepting four insert bases 568. Each of the insert bases 568 are rectangular-shaped and are slightly smaller than the respective recesses 574 such that the insert bases 568 slidably fit within the respective recesses 574. The insert bases 568 are fixed within the recesses 574 by bolts (not shown) that are threaded into bores (not shown) similar to the bolts 78 and the respective bores 74 described with reference to the frame 62 of FIG. 11.

The inserts 550, as in FIG. 22, are slidably insertable within the respective recesses 548 such that the inserts 550 mateably engage insert receiving portions 576 of respective mold cavities 538, as in FIG. 21, when the molding machine 510 is in a closed position 578. Each insert 550 is held in respective recesses 548 of the insert bases 568, as in FIG. 22, by bolts (not shown) which threadably engage bores (not shown) within the inserts 550, similar to the bolts 90 and the bores 88 depicted in FIG. 11.

The inserts 550 may take the form of a cuff accent pattern insert 580 as in FIG. 19. The cuff accent pattern insert 580 includes a cavity pattern 582 for forming the accent apertures 186a–c of the cuff 114 as in FIG. 3. Alternatively, the insert 550 may comprise a cuff accent pattern insert 590 as in FIG. 20. The cuff accent pattern insert 590 includes a cavity pattern 592 for forming the accent apertures 314 in the cuff 314 as in FIG. 7.

The molding machine 510 is preferably a Model I5F 390VL injection molding machine available from Toshiba International of San Francisco, Calif. The plastic resin is preferably a molding resin, such as Himont TPO-45A-C modified polypropylene synthetic resin alloy. Himont TPO-45A-C resin alloy is available from Himont Advanced Materials Company of Lansing, Michigan.

Although the present invention has been described with reference to preferred embodiments, workers skilled in the art will recognize that changes may be made in form and detail without departing from the spirit and scope of the invention.

What is claimed is:

1. A method of molding different versions of a skate component, the method comprising:
    providing a mold, the mold having a recess, the mold defining a mold surface of a mold cavity, the mold surface of the mold cavity capable of shaping the skate component, and the recess creating a gap in the mold surface of the mold cavity;
    attaching a first mold insert within the recess, attachment of the first mold insert closing the gap in the mold surface of the mold cavity and attachment of the first mold insert effective to set a skate feature;
    injecting molding resin into the mold cavity, the cavity including the first mold insert, to form a first version of the skate component;
    removing the first mold insert from the recess, removal of the first mold insert opening the gap in the mold surface of the mold cavity;
    attaching a second mold insert within the recess, attachment of the second mold insert closing the gap in the mold surface of the mold cavity and attachment of the second mold insert effective to set the skate feature; and
    injecting molding resin into the mold cavity, the mold cavity including the second mold insert, to form a second version of the skate component.

2. The method of claim 1 wherein the skate feature comprises an accent pattern.

3. The method of claim 2 wherein the skate component comprises a cuff of an in-line roller skate.

4. The method of claim 2 wherein the skate component comprises a boot of an in-line roller skate.

5. The method of claim 1 wherein the skate feature comprises a fastening aperture pattern.

6. The method of claim 5 wherein the skate component comprises a boot of an in-line roller skate.

7. The method of claim 1 wherein the mold comprises a plurality of mold portions and wherein the recess is located in one of the mold portions.

8. The method of claim 7 wherein the mold portions comprise an outer mold portion and an inner mold portion and wherein the mold surface comprises an outer mold surface and an inner mold surface, with the outer mold portion defining the outer mold surface and the inner mold portion defining the inner mold surface.

9. The method of claim 8 wherein the recess is located in the outer mold portion.

10. The method of claim 9 wherein the inner mold portion is the same when the first and second versions of the skate component are formed.

11. The method of claim 8 wherein the first mold insert or the second mold insert defines part of the inner mold surface and part of the outer mold surface.

12. The method of claim 8 wherein the first mold insert and the second mold insert define part of the inner mold surface and part of the outer mold surface.

13. A method of producing a first skate with lacing apertures and a second skate free of lacing apertures, the method comprising:
    providing a single mold, the mold having a mold cavity;
    attaching a first mold insert within the mold cavity, the first mold insert capable of including the lacing apertures in the first skate during molding of the first skate;
    injecting molding resin into the mold cavity, the cavity including the first mold insert, to form the first skate with lacing apertures;
    substituting a second mold insert for the first mold insert, the second mold insert capable of excluding the lacing apertures from the second skate during molding of the second skate; and
    injecting molding resin into the mold cavity, the cavity including the second mold insert, to form the second skate free of lacing apertures.

14. The method of claim 13 wherein the second mold insert is capable of molding buckle apertures and wherein the second skate is molded to include a buckle aperture set.

15. The method of claim 13, the method further comprising attaching a third mold insert within the mold cavity, in addition to attaching the first mold insert within the mold cavity, such that the step of injecting molding resin into the mold cavity to form the first skate with lacing apertures results in the first skate also having an accent pattern.

16. The method of claim 15, the method further comprising substituting a fourth mold insert for the third mold insert, in addition to substituting the second mold insert for the first mold insert, such that the step of injecting molding resin into the mold cavity to form the second skate free of lacing apertures results in the second skate having an accent pattern.

17. A method of producing a first skate component with a first accent pattern and a second skate with a second accent pattern, the method comprising:
    providing a mold, the mold having a mold cavity, the mold cavity defined by an inner mold cavity surface and an outer mold cavity surface;
    attaching a first mold insert within the mold cavity, the first mold insert effective to define part of the inner mold cavity surface and part of the outer mold cavity surface and the first mold insert effective to set the first accent pattern;

injecting molding resin into the mold cavity, the mold cavity including the first mold insert, to form the first skate component with the first accent pattern;

substituting a second mold insert for the first mold insert within the mold cavity, the second mold insert effective to define part of the inner mold cavity surface and part of the outer mold cavity surface and the second mold insert effective to set a second accent pattern that is different from the first accent pattern; and injecting molding resin into the mold cavity, the cavity including the second mold insert, to form the second skate component with the second accent pattern.

18. A method of configuring a skate component that is made in a mold, the method comprising:

positioning a first mold insert within a mold cavity of the mold, the mold cavity defined by an inner mold cavity surface and an outer mold cavity surface after positioning of the first mold insert within the mold cavity, the inner mold cavity surface facing the outer mold cavity surface, the first mold insert effective to give the mold cavity a first shape by defining part of the inner mold surface and part of the outer mold surface, and part of the inner mold surface and part of the outer mold surface defined by the mold; and injecting molding resin into the mold cavity having the first shape to form the skate component; and substituting a second mold insert for the first mold insert to give the mold cavity a second shape.

19. The method of claim 18 and further comprising attaching a third mold insert within the mold cavity to give the mold cavity a third shape.

20. The method of claim 19 and further comprising substituting a fourth mold insert for the third mold insert to give the mold cavity a fourth shape.

21. A method of configuring a skate component in a mold, the mold comprising a mold core and the mold having surfaces that define a mold cavity, the method comprising:

positioning a first mold insert within the mold cavity and in contact with the mold core to modify the mold cavity and provide the mold cavity with a first configuration;

injecting molding resin into the mold cavity having the first configuration to form the skate component; and replacing the first mold insert with a second mold insert to provide the mold cavity with a second configuration.

22. The method of claim 21 wherein the second mold insert is in contact with the mold core.

23. The method of claim 21 wherein:

the first mold insert has a first surface and the mold core has a second surface;

the first surface is in contact with the second surface;

the mold cavity is defined by an inner mold cavity surface and an outer mold cavity surface after positioning of the first mold insert within the mold cavity;

the inner mold cavity surface faces the outer mold cavity surface, the mold core defining at least part of the inner mold cavity surface; and the first mold insert extends between the inner mold cavity surface and the outer mold cavity surface.

\* \* \* \* \*